UNITED STATES PATENT OFFICE.

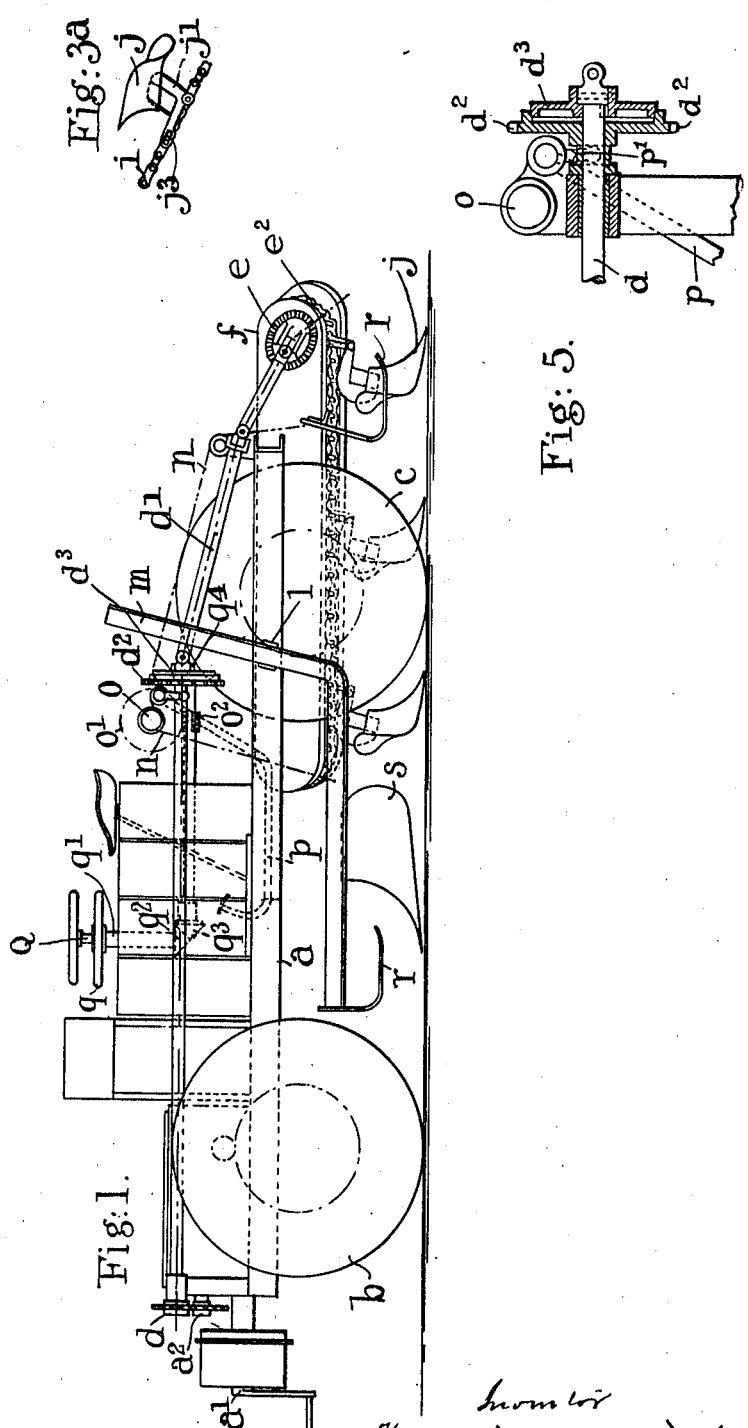

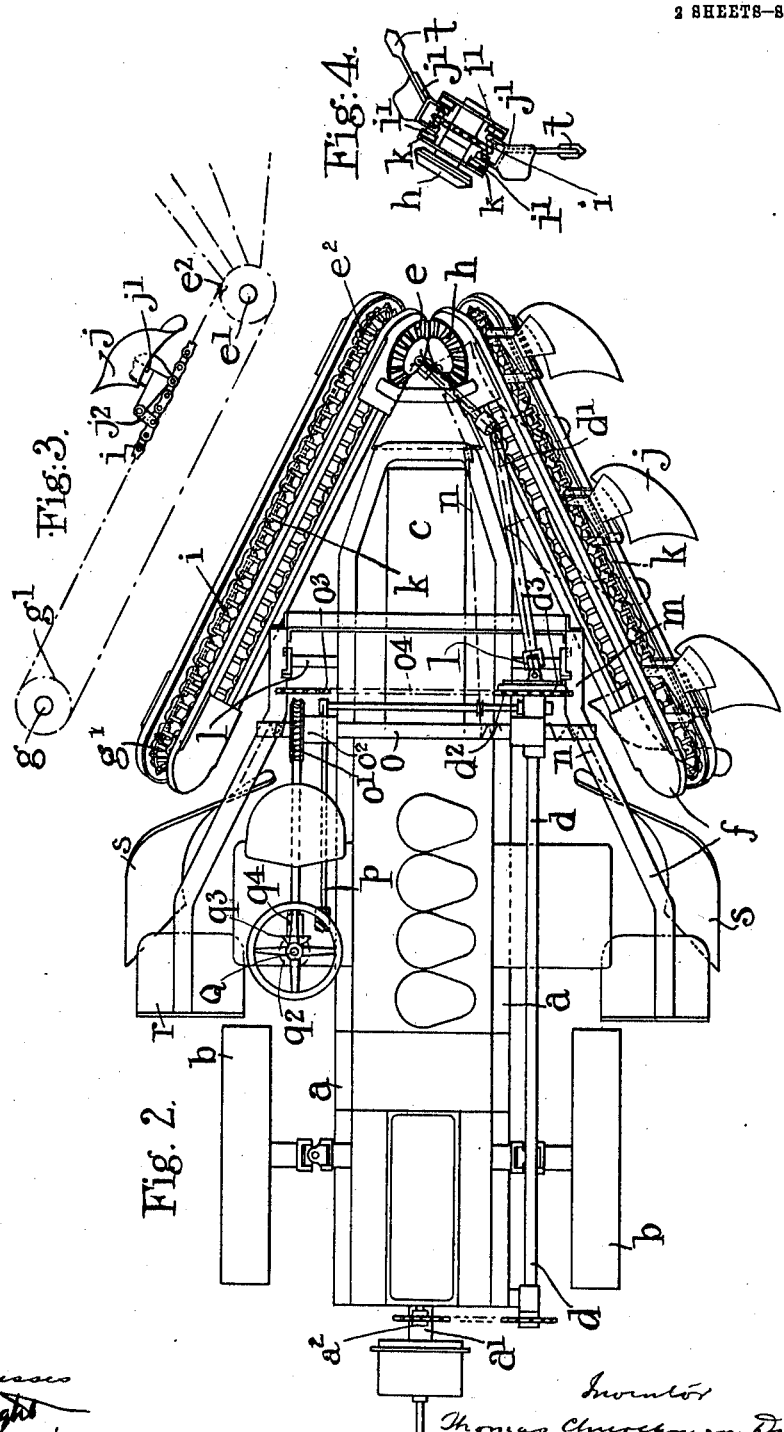

THOMAS CHURCHMAN DARBY, OF WICKFORD, ENGLAND.

IMPLEMENT FOR PLOWING AND OTHERWISE CULTIVATING LAND.

988,315.  Specification of Letters Patent.  Patented Apr. 4, 1911.

Application filed November 8, 1909. Serial No. 526,868.

*To all whom it may concern:*

Be it known that I, THOMAS CHURCHMAN DARBY, a subject of the King of Great Britain, residing at Wickford, Essex, England, have invented new and useful Improvements in Implements for Plowing and Otherwise Cultivating Land, of which the following is a specification.

The object of the present invention is to produce an improved power driven cultivating implement.

A machine constructed in accordance with the present invention, is able to cultivate a whole stretch at the same time and will leave the original furrows, or, if desired, it will cultivate the land and leave it flat.

In carrying the invention into effect I employ a motor having two front driving and steering wheels, a central rear wheel, and a separate V shaped frame at the rear carrying the cultivating tools, as described in the specification of British Letters Patent granted to me and others, No. 13,476 of the year 1905.

According to the present invention the cultivating tools are preferably in the form of plows, but spring tines or other tools may be employed. These tools are carried by endless chains which are arranged along each side of the separate V frame, the sprockets of which may be vertical, but are preferably inclined as shown, so that the tools work the ground as they pass backward and then return along the top side of the chain in such a position that they do not drop earth onto the lower stretch of the chain.

The invention is illustrated in the accompanying drawing in which—

Figure 1 is a side elevation, one side of the V frame being removed, and Fig. 2 is a plan of the improved cultivating implement. Both these views are somewhat diagrammatic but are sufficient to explain construction and operation of the mechanism. Fig. 3 is a side elevation of one of the cultivating tools (a plow) and part of the endless chain by which it is carried, and Fig. 3$^a$ is a modification of the same. Fig. 4 is a cross section of one side of the V shaped frame. Fig. 5 is a cross section through the driving clutch and some parts adjacent thereto.

The motor tractor $a$ has two front driving and steering wheels $b$ and a central rear wheel $c$.

$a^1$ is the crank shaft of the engine, from which is driven, at a reduced speed, the shaft $a^2$, which, by a chain and chain wheels, gives motion to the shaft $d$ mounted in suitable bearings on the motor tractor $a$. The shaft $d$ gives motion to the jointed or flexible shaft $d^1$, indicated by a broken line, to which is coupled the bevel wheel $e$ mounted on a spindle $e^1$ in one side of the V shaped frame $f$. The spindle $e^1$ has fixed thereon a chain wheel $e^2$, and at the forward end of the same side of the V shaped frame is mounted another spindle $g$ on which is fixed a chain wheel $g^1$. The bevel wheel $e$ gears with another similar bevel wheel $h$ mounted on a shaft in the other side of the V shaped frame, and on this shaft is fixed a chain wheel similar to the chain wheel $e^2$, and at the forward end of this side of the V shaped frame is another spindle on which is fixed a chain wheel similar to the chain wheel $g^1$. Two chains $i$ connect the rear chain wheels with the front chain wheels and on each chain are fixed the cultivating tools. The spindles on which the chain wheels are fixed are inclined downward as seen in Fig. 4; consequently the chains work in an inclined plane and the upper part of each chain is farther from the center line of the machine than the lower part. By this means the plows $j$, or other tools, on the upper stretch of the chains $i$ do not drop any earth onto the lower stretch of the chain.

Each plow $j$, or other tool, is preferably connected to two links of the chain $i$. It may, as shown in Fig. 3$^a$, be pivoted directly to two of the chain rivets, one of the pivot holes in the plow being elongated or formed as a slot $j^3$ to enable the chain $i$ to pass around the sprocket wheels $e^2$, $g^1$, or the head $j^1$ of the plow $j$, or other tool, may, as shown in Fig. 3, be pivoted to one rivet and may be connected to a rivet of another chain link by a connecting link $j^2$. As the plows $j$, or other tools, move from their straight paths onto the sprocket wheels, they move forward more rapidly, and as they leave the sprocket wheels their speed of motion is decreased. The plows $j$, or other tools, therefore leave the ground somewhat rapidly but enter the ground somewhat slowly.

The plows $j$, or other tools, are preferably guided as they pass through the land. This is effected by guiding the lower stretch or both stretches of the chain by means of troughs or channels $k$ or other suitable mechanism. The plowing or cultivating tool, at its upper end, is pivoted on the chain rivet outside the chain $i$, and on each end of the rivet is mounted a roller or block $i^1$ which runs in the side channels or ways $k$ facing each other.

The heads $j^1$ of the cultivating tools may be bent, as shown in Fig. 4, so that the tools will move in a vertical position through the ground, notwithstanding that the chains $i$ are mounted in an inclined plane.

The cultivating tools are preferably so arranged on the chains $i$ that they cultivate to the center of the travel of the machine. To enable this to be done the tools on one chain are intermediate of the tools on the other chain so that only one tool, or pair of tools arranged side by side, is moving around the rear sprocket wheels $e^2$ at a time.

The front part of the V frame is connected to the main frame by extensions $l$ on the motor tractor, which engage in guides $m$ on the side of the V shaped frame. The V frame is suspended by chains $n$ from the main frame, as in other cultivating implements, and is raised and lowered by rotating a shaft $o$ to which the suspending chains $n$ are attached. The shaft $o$ has a worm wheel $o^1$ keyed thereon, which is driven by a worm $o^2$ fixed on the same shaft $q^4$ as the chain wheel $o^3$. This latter receives motion by a chain $o^4$ from the chain wheel $d^2$ mounted on the shaft $d$. The chain wheel $d^2$ is driven by a friction clutch $d^3$. The chain wheel $d^2$ is put into action by the pedal lever $p$ and short lever $p^1$ the end of which latter is located in a groove in the boss of the chain wheel $d^2$. The parts are shown unclutched in Fig. 5. The shaft $o$ may also be operated by hand by means of the hand wheel $q$ fixed on the hollow shaft $q^1$ surrounding the steering rod Q. The hollow shaft $q^1$, by means of the bevel wheel $q^2$, gives motion to the bevel wheel $q^3$ on the shaft $q^4$, on which are mounted the worm $o^2$ and chain wheel $o^3$.

Suitable means may be provided for separately raising or lowering the front or back part of the V frame, thus enabling me to cultivate more deeply at one part than at another part, or to cultivate a stretch evenly across its entire width.

Means are provided for adjusting the tension of the chain carrying the tools by moving the pins forward on which the front sprocket wheels rotate.

The V shaped frame is provided with shoes $r$ or with wheels and when it is plowing or cultivating it is let down until these shoes or wheels rest on the ground. Thus they regulate the depth of the work. After the shoes or wheels have reached the ground the chains $n$ are slackened. These shoes or wheels may be adjusted in height or the cultivating tools may be adjusted with relation to their heads.

When plowing I preferably attach to the front of each side of the V shaped frame a plow breast $s$ to open the land for the plows $j$ carried by the chains. These plow breasts $s$ may be replaced by cultivating tools similar to the cultivating tools $t$ shown in Fig. 4.

It is obvious that the angle of the V shaped frame may be at the front, in which case the tools will work backward and outward. This construction would be suitable with a four wheel motor.

What I claim is:—

1. In an implement for cultivating land, the combination of a main frame, a motor carried by said main frame, a separate V shaped frame supported by the main frame, two pairs of sprockets carried by the V shaped frame and driven by the motor, endless chains on said sprockets, and cultivating tools carried by the two chains, substantially as set forth.

2. In an implement for cultivating land, the combination of a main frame, a motor carried by said main frame, a separate V shaped frame supported by the main frame, two pairs of sprockets carried by the V shaped frame and driven by the motor, endless chains on said sprockets, chain guides carried by the sides of the V shaped frame, and cultivating tools carried by the endless chains, substantially as set forth.

3. In an implement for cultivating land, the combination of a main frame, a motor carried by said frame, a separate V shaped frame supported by the main frame, two pairs of outwardly inclined sprockets carried by the V shaped frame and driven by the motor, endless chains on said sprockets, and cultivating tools carried by the two chains, substantially as set forth.

4. In an implement for cultivating land, the combination of a main frame, a motor carried by said frame, a separate V shaped frame supported by the main frame, two pairs of outwardly inclined sprockets carried by the V shaped frame and driven by the motor, endless chains on said sprockets, and cultivating tools carried by the two chains and having bent heads so that the tools will work in a vertical position through the ground, substantially as set forth.

5. In an implement for cultivating land, the combination of a main frame, a motor carried by said frame, a separate V shaped frame supported by the main frame, two pairs of sprockets carried by the V shaped frame and driven by the motor, endless chains on said sprockets, cultivating tools each pivoted to the rivet of one link of the chain, and means for connecting the tool to another link of the chain, substantially as set forth.

6. In an implement for cultivating land, the combination of a main frame, a motor carried by said frame, a separate V shaped frame supported by the main frame, two pairs of sprockets carried by the V shaped frame and driven by the motor, endless chains on said sprockets, chain guides carried by the sides of the V shaped frame, cultivating tools pivoted to the chain rivets outside the chains, and rollers carried by the outer ends of the rivets and running in the chain guides, substantially as set forth.

7. In an implement for cultivating land, the combination of a main frame, a motor carried by said main frame, a separate V shaped frame supported by the main frame, two pairs of sprockets carried by the V shaped frame and driven by the motor, endless chains on said sprokets, cultivating tools carried by the two chains, and separate means for raising and lowering the front and back parts of the V shaped frame, substantially as set forth.

8. In an implement for cultivating land, the combination of a main frame, a motor carried by said main frame, a separate V shaped frame supported by the main frame, two pairs of sprockets carried by the V shaped frame and driven by the motor, endless chains on said sprockets, cultivating tools carried by the two chains, intermeshing bevel wheels by which said sprockets are driven, and a flexible shaft driven by the motor and giving motion to one of said bevel wheels, substantially as set forth.

9. In an implement for cultivating land, the combination of a main frame, a motor carried by said frame, a separate V shaped frame, chains attached to the main frame and supporting the V shaped frame, means carried by said V shaped frame governing the depth of the work, two pairs of sprockets carried by the V shaped frame and driven by the motor, endless chains on said sprockets, and cultivating tools carried by said chains, substantially as set forth.

10. In an implement for cultivating land, the combination of a main frame, a separate V shaped frame supported by the main frame, two pairs of sprockets carried by the V shaped frame and driven by the motor, endless chains on said sprockets, cultivating tools carried by the two chains, and fixed cultivating tools carried by the front ends of the V shaped frame to open the land for the other cultivating tools, substantially as set forth.

11. In an implement for cultivating land, the combination of a main frame, a motor carried by said main frame, a separate V shaped frame supported by the main frame, two pairs of sprockets carried by the V shaped frame and driven by the motor, endless chains on said sprockets, cultivating tools carried by the two chains, guides carried by the V shaped frame, and extensions carried by main frame engaging with said guides, substantially as set forth.

12. In an implement for cultivating land, the combination of a main frame, a motor carried by said frame, a separate V shaped frame, a shaft carried by the main frame, chains supporting the V shaped frame attached to said shaft, a worm by which the shaft is driven, a friction clutch operated by the motor and hand gearing for operating said worm, means carried by the V shaped frame for governing the depth of work, two pairs of sprockets carried by the V shaped frame and driven by the motor, endless chains on said sprockets, and cultivating tools carried by said chains, substantially as set forth.

In witness whereof I have hereunto set my hand in presence of two witnesses.

THOMAS CHURCHMAN DARBY.

Witnesses:
CLAUDE K. MILLS,
WM. GIRLING.

---

Copies of this patent may be obtained for five cents each, by addressing the "Commissioner of Patents, Washington, D. C."